United States Patent [19]

Campbell et al.

[11] Patent Number: 5,383,811
[45] Date of Patent: * Jan. 24, 1995

[54] FLEXIBLE NON-METALLIC BEARING LINER FOR TELESCOPIC STEERING COLUMN

[75] Inventors: Edward N. Campbell, Oklahoma City, Okla.; Thomas J. Keller, Cridersville, Ohio

[73] Assignee: Dana Corporation, Toledo, Ohio

[*] Notice: The portion of the term of this patent subsequent to Feb. 24, 2010 has been disclaimed.

[21] Appl. No.: 708,549

[22] Filed: May 31, 1991

[51] Int. Cl.⁶ .................... F16D 3/06; F16D 3/76; F16D 33/20; B62D 1/18
[52] U.S. Cl. .................... 464/89; 74/493; 384/42; 464/162; 464/902
[58] Field of Search .............. 464/75, 78, 85, 87, 464/89, 91, 162, 180, 902; 384/7, 10, 26, 37, 40–42; 74/493

[56] References Cited

U.S. PATENT DOCUMENTS

| | | | |
|---|---|---|---|
| 2,675,283 | 4/1954 | Thomson . | |
| 3,137,148 | 6/1964 | Kayser | 464/91 X |
| 3,369,425 | 2/1968 | Runkle et al. | 74/493 |
| 3,714,841 | 2/1973 | Grosseau | 74/492 |
| 3,877,319 | 4/1975 | Cooper | 74/492 |
| 4,020,651 | 5/1977 | Callies | 464/162 X |
| 4,045,980 | 9/1977 | Woodward et al. | 464/162 |
| 4,106,311 | 8/1978 | Euler | 464/162 X |
| 4,496,333 | 1/1985 | Cleveland | 464/162 |
| 4,551,115 | 11/1985 | Ferguson | 464/180 X |
| 4,667,530 | 5/1987 | Mettler et al. | 74/493 |
| 5,080,334 | 1/1992 | Mihara et al. | 384/47 X |

*Primary Examiner*—Daniel P. Stodola
*Assistant Examiner*—William G. Battista, Jr.
*Attorney, Agent, or Firm*—F. B. McDonald

[57] ABSTRACT

A bearing liner comprises an elongated resilient non-metallic unitary structure having a plurality of generally planar sides for placement between a steering sleeve and correspondingly planar-sided steering shaft. The liner is adapted to receive the steering shaft, and in a preferred form comprises four sides having a square cross-section. Each juxtaposed side is joined together by a flexible web which has a cross-section substantially thinner than the average cross-sections of the sides. Each of the sides includes two arcuate, axially extending integral spring channels which define its edges and which are designed to accommodate torsional lost motion between the steering shaft and sleeve members. In a preferred form, the liner is formed of an injection molded composition of nylon having carbon fibers and polytetraflouroethylene, the carbon fiber imparting strength to the composition, the polytetrafluoroethylene supplying lubricity.

4 Claims, 1 Drawing Sheet

FLEXIBLE NON-METALLIC BEARING LINER FOR TELESCOPIC STEERING COLUMN

BACKGROUND OF THE INVENTION

This invention relates to heavy duty vehicular steering column assemblies of the type incorporating telescoping steering shafts supported in sleeves. More particularly, this invention relates to bearing liners employed in the interface between steering shaft and sleeve members.

Bearing liners have evolved significantly from the old bronze and babbitt days. In fact, the loads and conditions under which current day truck and off-highway steering column assemblies must operate are more severe than ever. New materials, particularly synthetics, which either minimize the need for lubrication or avoid such need altogether, are now employed with great success. There remain, however, several aspects of steering assembly design in need of improvement.

For example, some anti-backlash mechanisms of today's bearing liners tend to be undependable over the useful life of steering assemblies, particularly when subjected to relatively high stress conditions. Other anti-backlash designs are too closely toleranced to permit adequate flexibility or sufficient freedom in the axial or telescoping movement of the steering members. Still other designs do not permit adequate play, and often result in high frictional losses in operation. Finally, it is desirable that an improved bearing liner, for use in a heavy truck steering assembly subjected to hydraulic pressures on the order of 3000 psi, be fabricated of a simple one-piece or unitary structure.

SUMMARY OF THE INVENTION

A resilient steering shaft bearing liner provides a self-lubricating unitary structure for a non-cylindrical steering shaft, and specifically for one having a plurality of planar sides. The liner is defined by a multi-sided sleeve member adapted for placement between a telescoping steering shaft and supporting sleeve. In a preferred form, the bearing liner is a four-sided elongated resilient sleeve member for absorbing tolerance variations, as well as for alleviating play or backlash, between a commonly employed square steering shaft and a broached sleeve aperture or bore in which the shaft is supported. The four sides are generally flat or planar, and extend symmetrically along the axis of the liner; adjacent edges of the sides are integrally joined together by webs. The webs have cross-sections substantially thinner than the average cross-sections of the sides.

Each of the four sides contains a pair of spaced arcuate, axially extending, integral spring channels which define the axially extending edges of the sides. Thus, there are a total of eight spring channels adapted to resiliently absorb torsional lost motion between the square steering shaft and broached square sleeve bore.

In the same preferred form, the sides of the liner have slots extending axially from one end to the medial portions of the sides for accommodating insertion of that one end of the liner into the broached sleeve bore. The liner is formed of a nylon which includes a composition of carbon fiber as well as polytetrafluoroethylene (PTFE). The carbon fiber imparts strength to the nylon base, while the PTFE provides lubricity. The latter composition is injection molded to form the bearing liner of this invention.

DETAILED DESCRIPTION OF A PREFERRED EMBODIMENT

Figure 3:
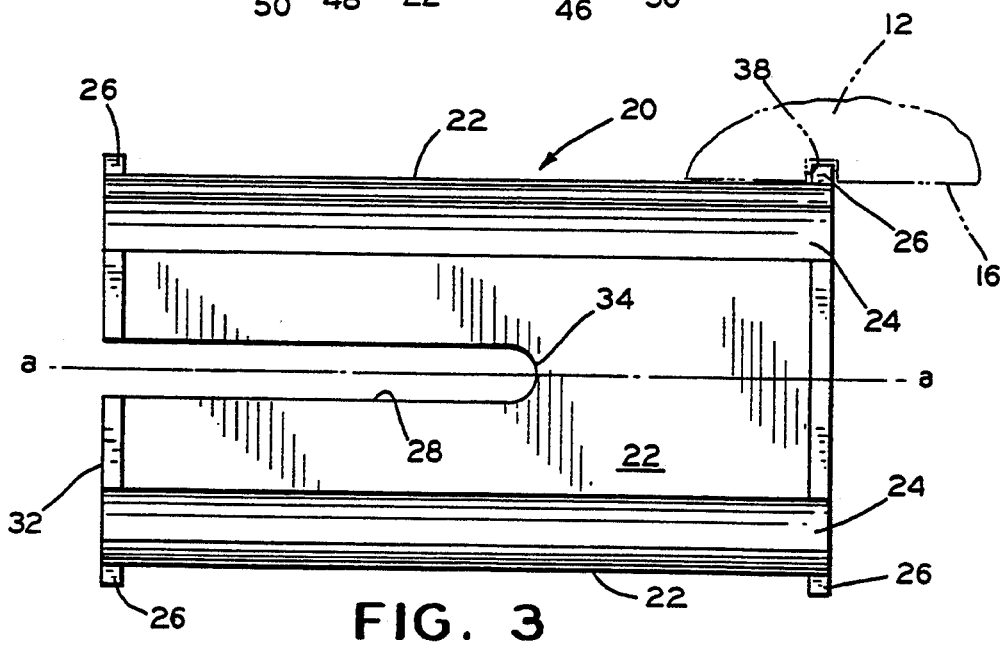
FIG. 3 is a side view of the same bearing liner.

Referring to the drawing figures, a steering sleeve assembly 10 (FIG. 1) includes an elongated sleeve 12 (shown only in cross-section) having an exterior cylindrical surface 18 and a broached square sleeve bore 16. A shaft 14 is telescopically supported within the bore 16 via direct engagement with a bearing liner 20 formed of a resilient non-metallic material, preferably an injection molded nylon having a composition of carbon fibers and PTFE. The shaft 14 undergoes limited axial movement along an axis a—a (FIG. 3), represented as point "A" in the center of FIG. 1, which passes through the centers of the sleeve 12 and the liner 20.

Neither the sleeve 12 nor the bearing liner 20 are subjected to axial movement along the axis a—a; only the shaft 14 moves relative to the latter members. Thus the liner 20 must accommodate sliding movement of the shaft 14 therein as well as slight rotary or torsional movement through an arc "R—R" (FIG. 1) within the sleeve 12. To resist axial movement of the liner 20 within the sleeve 12, a set of end flanges 26 (FIG. 3) engage slots shown in phantom at 38 within the broached square sleeve bore 16.

Elongated slots 28 extend axially from one axial end 32 (FIG. 3) of the liner 20 to facilitate insertion of that end into the broached bore 16 during assembly. It will be appreciated that in the preferred embodiment the slots 28 extend symmetrically along the axis "a—a" to medial portions 34 of the sides 22, for a distance of slightly greater than half the length of each side 22. The slots all have equal lengths and widths, and are positioned symmetrically with respect to one another.

Each spring channel 24 is integrally connected to a next adjacent channel 24 via a web 30 which has a substantially thinner cross-section than the average cross-section of any side 22. The thinness of the webs 30 will enable the flexibility necessary for the spring channels 24 to operate as intended, in addition to resiliently holding the sides together.

Figure 1:
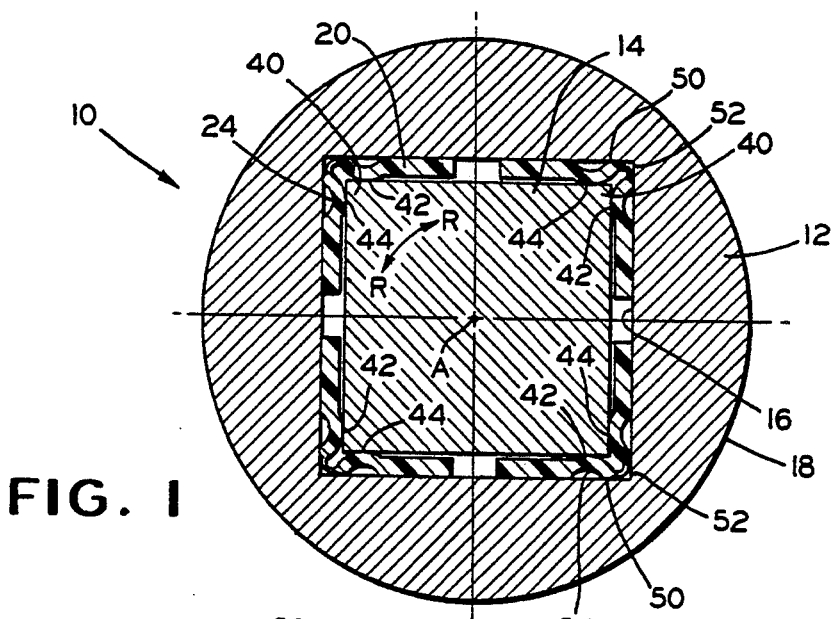
FIG. 1 is a cross-sectional view of a steering shaft assembly which incorporates a preferred embodiment of the resilient bearing liner of the present invention.
Figure 2:
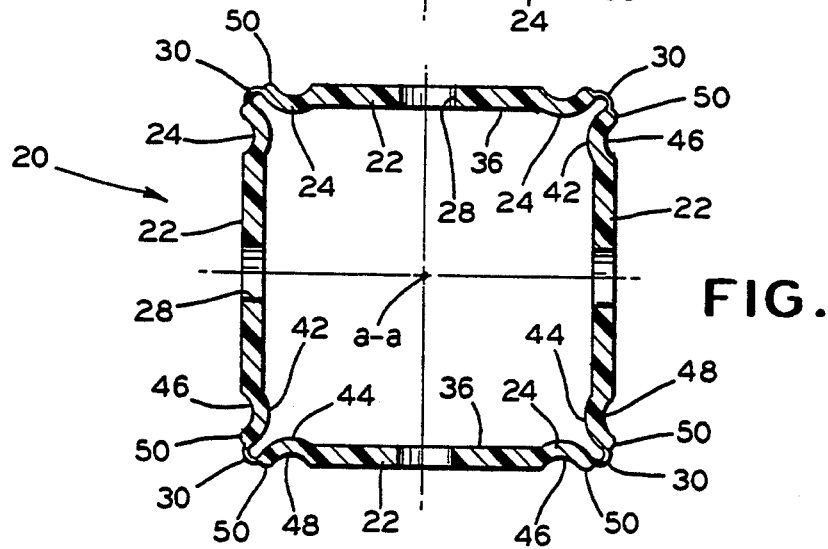
FIG. 2 is a cross-sectional view of the bearing liner depicted in FIG. 1.

The operation of the spring channels 24 may now be described in reference to FIGS. 1 and 2. Each spring channel 24 is U-shaped and as previously noted is positioned adjacent an edge of each side 22; in fact each of the channels defines an edge. Each channel is positioned adjacent one corner 40 of the shaft 14, and is aligned therewith for accommodating torsional loads imparted on the liner by the shaft. Thus it will be noted that clockwise rotation of the shaft about the arc "R—R" will impart a load on the top or apex 42 of every other four of the spring channels 24 (FIG. 1). Counterclockwise rotation of the shaft 14 will alternately apply a load against the remaining four apexes 44, as will be appreciated by those skilled in this art. Each arcuate spring channel 24 includes an extremity 50 in constant engagement with the aperture 16 of the sleeve 12. Whenever an apex 42, 44 is forced radially outwardly against the aperture, the extremity 50 will tend to slide along the aperture 16 toward a respective corner 52 of the aperture. Under a hard steering load, the spring channel 24 will completely flatten, thus causing each affected extremity 50 to slide toward its proximal corner 52. Conversely, upon reduction of such load, the extremity will slide away from the corner 52. Those skilled in the art will appreciate that the thinness of the web 30 will permit the flexibility necessary to accommodate relative displacements of the extremities 50 in accordance with the operation of this invention.

In preferred form, the spring channels 24 are sized to (a) accommodate anticipated tolerance absorption needs for any given application, as well as (b) alleviate backlash under a variety of loading conditions.

EXAMPLE

A bearing liner 20 in one preferred embodiment has an overall length of 4.0 inches. It is installed in a cylindrical steering sleeve 12 having a diameter of 1.75 inches. The slots 28 of the liner extend axially from one end 32 by a distance of 2.25 inches. In their uncompressed state, the slots are approximately one-eighth of an inch wide. The cross-sectional dimension of the liner is a square having equal sides of one inch nominal dimension with tolerances of −0.000 and +0.002 inch. The liner is adapted for being installed in a sleeve 12 having a broached square aperture 16 of one inch nominal dimension, with a tolerance of −0.000 and +0.002 inch. The thickness of each planar side 22 is 0.050 inch, with a tolerance of +0.000 and −0.002 inch. Each spring channel 24 has a thickness of approximately 0.030 inch, with tolerances of +0.002 and −0.002 inch. Each channel is radially inwardly bowed with respect to the axis "a—a" of the liner 20, and the apexes 42 and 44 of the sides 22 are approximately 10 thousands of an inch in height measured from adjacent surfaces of their respective sides 22. The undersides, 46 and 48 of each apex 42 and 44, respectively, define concave bottoms of each U-shaped spring channel 24. Each concave underside 46,48 measures approximately 20 thousandths of an inch below an adjacent extremity 50 in any given spring channel 24 (FIG. 2). Finally, each web 30 measures 10 to 15 thousandths of an inch in thickness.

Although only one preferred embodiment has been detailed and described herein, the following claims are envisioned to cover numerous additional embodiments which may fall within the spirit and scope thereof.

What is claimed is:

1. In an elongated non-metallic bearing liner adapted for placement between a telescoping steering sleeve and shaft, said liner defining a longitudinal axis and having at least four generally axially extending parallel planar sides, each side defining a pair of edges extending along said axis, wherein adjacent edges of two adjacent sides are integrally joined together by a web having a cross-section substantially thinner than the average cross-sections of said sides, said liner further defining a radial dimension extending perpendicularly to said axis, said web being outwardly bowed radially of said axis of said liner, wherein each of said adjacent edges comprises an arcuate, axially extending, integral spring means, whereby torsional lost motion between said steering shaft and steering sleeve may be resiliently absorbed, wherein each of said spring means comprises a U-shaped resilient spring channel, each side containing two spring channels, wherein, with respect to said axis, each U-shaped spring channel defines a radially inwardly bowed portion, and wherein said bearing liner further defines integral locator flanges positioned at each longitudinal end, each flange extending radially outwardly of said axis.

2. The bearing liner of claim 1 wherein each of said sides comprises a slot extending axially from one end of said liner and terminating at a medial portion of said liner, said slots adapted to close together for collapse of said liner sides together for insertion into a steering sleeve.

3. The bearing liner of claim 2 wherein said slots are elongated and identically dimensioned in length and width, each slot being symmetrically positioned in one side of said liner.

4. The bearing liner of claim 3 wherein said liner is formed of a composite of nylon filled with carbon fibers and polytetrafluoroethylene.

* * * * *